(12) United States Patent
Brugger

(10) Patent No.: US 11,919,105 B2
(45) Date of Patent: Mar. 5, 2024

(54) METHOD FOR WELDING PRETREATMENT OF COATED STEEL SHEETS

(71) Applicant: voestalpine Automotive Components Linz GmbH, Linz (AT)

(72) Inventor: Gerald Brugger, Linz (AT)

(73) Assignee: voestalpine Automotive Components Linz GmbH, Linz (AT)

( * ) Notice: Subject to any disclaimer, the term of this patent is extended or adjusted under 35 U.S.C. 154(b) by 549 days.

(21) Appl. No.: 17/010,304

(22) Filed: Sep. 2, 2020

(65) Prior Publication Data

US 2020/0398377 A1 Dec. 24, 2020

Related U.S. Application Data

(63) Continuation of application No. PCT/EP2019/054877, filed on Feb. 27, 2019.

(30) Foreign Application Priority Data

Mar. 2, 2018 (DE) ...................... 10 2018 104 829.7

(51) Int. Cl.
*B23K 26/24* (2014.01)
*B23K 26/0622* (2014.01)
(Continued)

(52) U.S. Cl.
CPC .......... *B23K 26/24* (2013.01); *B23K 26/0622* (2015.10); *B23K 26/142* (2015.10);
(Continued)

(58) Field of Classification Search
CPC .. B23K 26/24; B23K 26/0622; B23K 26/142; B23K 26/1462; B23K 26/60;
(Continued)

(56) References Cited

U.S. PATENT DOCUMENTS

| 5,918,367 A * | 7/1999 | Todo ...................... F01L 1/143 29/888.43 |
| 6,751,516 B1 * | 6/2004 | Richardson ........... B29C 64/153 700/118 |

(Continued)

FOREIGN PATENT DOCUMENTS

| CN | 106695121 A * | 5/2017 | ........... B23K 26/123 |
| DE | 10324274 A1 | 12/2004 | |

(Continued)

OTHER PUBLICATIONS

German Office Action of Priority Application No. 10 2018 104 829.7 dated Dec. 18, 2018.

(Continued)

*Primary Examiner* — Nathaniel E Wiehe
*Assistant Examiner* — Spencer H. Kirkwood
(74) *Attorney, Agent, or Firm* — Stephen J. Kenny; Vincenzo DiMonaco; Foley Hoag LLP

(57) ABSTRACT

The disclosure relates to a method for welding sheets provided with an aluminum silicon anti-corrosion coating, wherein chronologically before the welding, the aluminum silicon layer on the sheets in the region of the weld joint and the underlying intermetallic interlayer between the base material and the anti-corrosion coating is passed over with a laser and as a result, on the one hand, material of the aluminum silicon layer and the underlying intermetallic interlayer is vaporized and aspirated and on the other hand, a reaction with the base material extending into the base material is produced so that a metallic reaction ablation layer or alloying ablation layer is produced, which has iron and possibly alloying elements from the base material and aluminum silicon from the aluminum silicon layer and the intermetallic interlayer, the reaction layer reaching a thickness of 5 μm to 100 μm.

19 Claims, 20 Drawing Sheets

(51) Int. Cl.
- *B23K 26/14* (2014.01)
- *B23K 26/142* (2014.01)
- *B23K 26/40* (2014.01)
- *B23K 26/60* (2014.01)
- *B23K 101/18* (2006.01)
- *B23K 101/34* (2006.01)
- *B23K 103/20* (2006.01)

(52) U.S. Cl.
CPC .......... *B23K 26/1462* (2015.10); *B23K 26/40* (2013.01); *B23K 26/60* (2015.10); *B23K 2101/18* (2018.08); *B23K 2101/34* (2018.08); *B23K 2103/20* (2018.08)

(58) Field of Classification Search
CPC .... B23K 26/40; B23K 26/361; B23K 26/322; B23K 26/0608; B23K 26/36; B23K 26/123; B23K 2103/20; B23K 2103/04; B23K 2103/08; B23K 2101/18; B23K 2101/34; B23K 2101/006; B23K 101/12; B23K 103/04; B23K 35/32; C23F 4/00
See application file for complete search history.

(56) References Cited

U.S. PATENT DOCUMENTS

| | | | |
|---|---|---|---|
| 9,289,855 B2 | 3/2016 | Evangelista et al. | |
| 2008/0016684 A1* | 1/2008 | Olechnowicz | C03C 3/062 |
| | | | 29/748 |
| 2014/0151347 A1* | 6/2014 | Evangelista | B23K 26/364 |
| | | | 219/121.69 |
| 2014/0308156 A1* | 10/2014 | Oh | C22C 38/08 |
| | | | 420/104 |
| 2015/0171240 A1* | 6/2015 | Kapur | H01L 31/0516 |
| | | | 438/98 |
| 2017/0080523 A1* | 3/2017 | Andersson | B23K 9/173 |
| 2017/0095886 A1* | 4/2017 | Gu | B23K 26/361 |
| 2017/0173734 A1* | 6/2017 | Evangelista | B23K 26/60 |

FOREIGN PATENT DOCUMENTS

| | | |
|---|---|---|
| DE | 102008006241 A1 | 7/2009 |
| DE | 202007018832 U1 | 9/2009 |
| DE | 102012111118 B3 | 4/2014 |
| DE | 102013101953 A1 | 8/2014 |
| DE | 102013215346 A1 | 2/2015 |
| EP | 2511039 A1 | 10/2012 |
| EP | 2883646 B1 | 11/2016 |
| JP | 2017/209733 A | 11/2017 |
| WO | WO-2017/203321 A1 | 11/2017 |
| WO | WO-2019/166498 A1 | 9/2019 |

OTHER PUBLICATIONS

International Search Report and Written Opinion for International Application No. PCT/EP2019/054877 dated Jul. 12, 2019.

Lee et al., "Effect of the Die Temperature and Blank Thickness on the Formability of a Laser-Welded Blank of a Boron Steel Sheet with Removing Al-Si Coating Layer," Advances in Mechanical Engineering, 2014(Article ID 925493): 10 pages (2014).

* cited by examiner

| Trial | Ablation (Powerlase i1600E-60) | | | | Welding (Trumpf 6006 focus diameter Ø = 0.6 mm) | | |
|---|---|---|---|---|---|---|---|
| | Compl. abl. [m/min] | Part. abl. [W] | f [kHz] | $p_{Blowing\ nozzle}$ [bar] | $V_W$ [m/min] | $P_W$ [W] | Gas (argon) $V_{gas}$ [l/min] |
| 2.3 | 8.5 | 1702 | 18 | 1.5 | 8.5 | 4920 | 15 |

FIG. 17

| | Compl. abl. [m/min] | Ablation (Powerlase i1600E-60) | | | |
|---|---|---|---|---|---|
| | | Pulse duration [ns] | Average ablation power $P_{abl}$ [W] | f [kHz] | Blowing nozzle pressure $p_{Blowing\ nozzle}$ [bar] |
| Complete ablation | 8.5 | 64 | 1191 | 12 | 0.5 |
| Partial ablation | 8.5 | 56 | 923 | 10 | 0.5 |
| Alloying ablation | 8.5 | 91 | 1702 | 18 | 0.5 |

FIG. 20

METHOD FOR WELDING PRETREATMENT OF COATED STEEL SHEETS

CROSS-REFERENCE TO RELATED APPLICATIONS

This application is a Continuation of and claims the benefit of priority under 35 USC 120 to PCT/EP2019/054877 filed Feb. 27, 2019, which claims priority to DE 10 2018 104 829.7 filed Mar. 2, 2018, the entire contents of each are hereby incorporated by reference.

The present disclosure relates to a method for welding pretreatment of coated steel sheets.

In the prior art, it is known to use steel sheets of different thicknesses and/or steel sheets of different compositions to produce welded sheet bars, which can then undergo further processing such as a forming process or heat treatment.

The purpose of this is that the different thicknesses or the different compositions allow the properties of a completely formed component to be embodied differently from one zone to another.

It is also known to weld sheets that have an anti-corrosion coating and in particular, a metallic anti-corrosion coating such as a zinc or aluminum coating. In particular, it is known to weld high hardenability manganese boron steels to each other, which are then used to produce structural components of vehicle bodies.

Such custom-made sheet bars composed of steel sheets are also referred to as "tailored blanks." Known welding methods include arc welding, laser welding, and the laser arc hybrid welding method.

Particularly with aluminum silicon-coated sheets, it has turned out that the aluminum silicon layer causes problems in the welding of the sheet when conventional welding methods are involved. Clearly, the coating elements have a negative influence on the composition of the welding seam.

Strategies have therefore been developed for removing aluminum silicon layers in some sub-regions before the welding in order to reduce the aluminum silicon concentration in the welding seam.

When welding such coated sheets, it is also known from the prior art for a filler rod to be used or for a powder to be added.

DE 10 2012 111 118 B3 has disclosed a method for laser welding one or more workpieces composed of press-hardenable steel, in particular manganese boron steel, in which the welding is carried out in a butt joint and in which the workpiece has or the workpieces have a thickness of at least 1.8 mm and/or a thickness difference of at least 0.4 mm is produced at the butt joint, where during the laser welding, a filler rod fed is fed into the weld pool that is produced with a laser beam. In order to ensure that during the hot-forming, the welding seam can reliably harden into a martensitic structure, this document provides for adding at least 1 alloying element from the group including manganese, chromium, molybdenum, silicon, and/or nickel to the filler rod thus promoting the formation of austenite in the weld pool that is produced with the laser beam, this at least one alloying element being present in the filler rod with a mass percentage that is at least 0.1 percent by weight greater than in the press-hardenable steel of the workpiece or workpieces.

DE 10 2014 001 979 A1 has disclosed a method for laser welding one or more workpieces composed of hardenable steel in the butt joint, the steel particularly being a manganese boron steel and the workpieces having a thickness of between 0.5 and 1.8 mm and/or with a thickness difference of between 0.2 and 0.4 mm being produced in the butt joint; in the laser welding, a filler rod is introduced into the weld pool and the weld pool is produced exclusively by the one laser beam. In order to ensure that during the hot-forming, the welding seam can reliably harden into a martensitic structure, this document provides for the filler rod to contain at least one alloying element from the group including manganese, chromium, molybdenum, silicon, and/or nickel, thus promoting the formation of austenite.

EP 2 737 971 A1 has disclosed a tailor welded blank and a method for producing it in which the sheet is produced in that sheets of different thicknesses or compositions are bonded to one another and which is supposed to reduce quality problems in the welding zone. Here, too, a filler rod is used, the latter being embodied so that in the temperature range from 800 to 950° C., no ferrite is produced. This method is supposed to be particularly suitable for AlSi-coated sheets; this rod should also have a higher content of austenite-stabilizing elements, which in particular consist of carbon or manganese.

EP 1 878 531 B1 has disclosed a method for hybrid laser arc welding of surface-coated metallic workpieces, the intent being for the surface coating to contain aluminum. The laser beam is supposed to be combined with at least one arc so that a melting of the metal and a welding of the part or parts is produced and before being welded, at least one of the parts has deposits of the aluminum silicon coating on the surface of one of its lateral edges that are to be welded.

EP 2 942 143 B1 has disclosed a method for joining two blanks; the blanks are steel sheets with a coating that comprises a layer composed of aluminum or an aluminum alloy; the two parts are welded to each other using a laser beam and an arc; the arc welding torch comprises a filler wire electrode and the filler wire electrode consists of a steel alloy that contains stabilizing elements; the laser and arc are moved in a welding direction; and the arc welding torch and laser beam are positioned successively in the welding direction.

EP 2 883 646 B1 has disclosed a method for joining two blanks in which at least one of the blanks comprises a layer composed of aluminum or an aluminum alloy, a metal powder is introduced into the welding zone during the welding procedure, and the metal powder is an iron-based powder containing gamma-stabilizing elements and the laser beam welding is a two-point laser beam welding.

EP 2 007 545 B1 has disclosed a method for producing a welded part with very good mechanical properties in which a steel sheet has a coating that consists of an intermetallic layer and a metal alloy layer situated on the intermetallic layer. For the welding of the sheets, the metal alloy layer on the intermetallic layer should be removed at the periphery of the sheet, i.e. the regions that are to be welded, this intermetallic layer being an aluminum alloy layer. This coating should be removed by a laser beam so that this layer, which is embodied as an aluminum silicon layer, is vaporized before the welding in order to avoid harmful influences of the aluminum in the welding seam. At the same time, the intermetallic layer should be left behind in order to produce corrosion-inhibiting effects if possible.

U.S. Pat. No. 9,604,311 B2 has disclosed a complete ablation process in which a metallic layer and an intermetallic layer are completely vaporized by laser.

With methods in which a complete ablation is performed, it is disadvantageous that in the regions that are completely freed of an aluminum silicon layer, scale forms on the surface during the welding or at the very latest, during the hardening of the components. This reduces the cross-section in the vicinity of the seam and is basically undesirable.

With a partial ablation, it is disadvantageous that it must be performed very precisely in order to remove only the aluminum silicon layer, but retain the intermetallic interlayer as much as possible. This is not always entirely successful. It is also disadvantageous that in the partial ablation, the still persisting intermetallic interlayer can cause too much aluminum to be present in the welding seam so that the welding seam does not have the required stability and the component fails at the welding seam. This is basically undesirable.

With methods in which a powder is introduced into the welding seam out, however, it has turned that it is quite difficult to meter the powder.

Basically, the problem is that in aluminum silicon layers on sheets, upon welding, the welding seam is not as strong, which is clearly due to the aluminum that is introduced into the welding seam along with this powder.

SUMMARY OF THE DISCLOSED SUBJECT MATTER

The object of the disclosure is to create a method for welding pretreatment with which stabile welding seams can be reliably produced.

According to the disclosure, the realization has been made that the disadvantageous effect of the aluminum and in particular the disadvantageous effect of a still-persisting intermetallic interlayer can be eliminated by selectively performing the welding preparation with a laser in such a way that in lieu of a complete ablation, in which the intermetallic interlayer is completely eliminated, or a partial ablation, in which the intermetallic interlayer is retained, a reaction ablation is performed in which the intermetallic interlayer and possibly also remaining components of the aluminum silicon layer on the one hand and the steel base material on the other are used to produce a metallic reaction layer, which can be much thicker than the intermetallic interlayer and extends into the base material. In this reaction layer, the alloying is performed in such a way that aluminum and silicon are dispersed to such an extent that on the one hand, a protection from scale formation is indeed provided, but a negative impact on the strength of the welding seam is undetectable. According to the disclosure, however, this only succeeds with a selective guidance of the laser.

According to the disclosure, it has been discovered that the disadvantageous effect of the aluminum must be avoided and the introduction of aluminum that inevitably occurs must be neutralized.

In the prior art, partial ablation procedures that are performed for this purpose a laser must be guided very precisely in order to even be able to achieve a desired partial ablation.

In practice, it has turned out that this partial ablation simply does not reliably succeed and the welding seam therefore does not have reproducible properties.

Much more important than the absolute properties of the welding seam are the relative properties of the welding seam over its length so that basically, the peak values with regard to the tensile strength in a few regions of the welding seam are of less interest than uniform properties over the entire length of the seam, which result in reliable components.

On the other hand, the inventors have also realized that even in the complete ablation process according to the prior art, in which the entire aluminum silicon layer is removed, fluctuations result in a distinct reduction in the load-bearing cross-section of the welding seam edges, which yields results that are just as intolerable as those of the partial ablation.

The inventors have realized that both methods according to the prior art, i.e. the complete ablation and also the partial ablation of only the covering layer without the intermetallic layer, overshoot the mark in two directions. With the partial ablation according to the prior art, simply too much aluminum remains, which harms the welding seam. The complete ablation avoids the presence of any aluminum, but in the hardening process, the scale formation and decarburization occur, thus negatively affecting the load-bearing cross-section of the connection.

The inventors have realized, however, that a certain percentage of aluminum is harmless so that a stable ablation process can be achieved, which, after sheets pretreated in this way are welded, yields a welding seam that has the same load-bearing capacity as the hardened base material. The reaction layer exhibited particularly advantageous properties if the aluminum content was less than 11.3% by mass, preferably <10% by mass, in particular <8% by mass since in this case, the occurrence of harm to the welding seam can be sharply reduced.

The low quantity of aluminum in the metallic reaction layer does not form intermetallic phases and is instead present in a soluble form in the ferrite. Surprisingly, though, it has turned out that these low quantities of aluminum are in turn sufficient to provide protection from decarburization and powerful formation of scale. The inventors have realized that a percentage of greater than 1% by mass aluminum, preferably >2% by mass, gives the layer optimal properties since in this case, on the one hand, intermetallic phases are no longer present, but on the other hand, enough aluminum is present in order to correspondingly protect the base material.

The most optimal layer properties are therefore achieved with aluminum contents in the reaction layer of 1 to 11.3% by mass, preferably 1.5 to 10% by mass, particularly preferably 2 to 8% by mass.

The thickness of the aluminum-enriched reaction layer produced in this way is from 5 μm to 100 μm, preferably 15 μm to 80 μm, in particular 20 μm to 70 μm, particularly preferably 20 μm to 50 μm, the ablation being carried out with a pulsed laser.

For example, the suitable adjustments are a pulse length of 70 ns with a pulse frequency of 14 kHz and an average power of 1606 W.

This makes it possible to achieve ablation speeds of 9 m/min with a beam focus of 2.4×0.4 mm.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

FIG. 17: shows the parameters of the ablation and the welding;

FIG. 20: shows the test parameters for the complete ablation, partial ablation, and alloying ablation according to the disclosure.

DETAILED DESCRIPTION OF AN EXEMPLARY EMBODIMENT

It is known to provide hardenable steels with an anti-corrosion layer and in particular with an anti-corrosion layer that is intended to protect the steel from corrosion during hardening. This hardening usually takes place in such a way that the steel material is austenitized and then quench hardened so that the austenite is partially or completely converted into martensite and this brings about a hardening. The usual temperatures for this are much higher than 800° C. At such temperatures, surface oxidation and decarburization of the steel material occur if it has not been provided with a layer to protect it from decarburization and oxidation.

For example, typical hardenable steels have the following general alloy composition (all indications in % by mass):

| | |
|---|---|
| carbon (C) | 0.03-0.6 |
| manganese (Mn) | 0.8-3.0 |
| aluminum (Al) | 0.01-0.07 |
| silicon (Si) | 0.01-0.8 |
| chromium (Cr) | 0.02-0.6 |
| titanium (Ti) | 0.01-0.08 |
| nitrogen (N) | <0.02 |
| boron (B) | 0.002-0.02 |
| phosphorus (P) | <0.01 |
| sulfur (S) | <0.01 |
| molybdenum (Mo) | <1 | residual iron and smelting-related impurities.

Particularly suitable steels are those of the following alloy composition:

| | |
|---|---|
| carbon (C) | 0.03-0.30 |
| manganese (Mn) | 1.00-3.00 |
| aluminum (Al) | 0.03-0.06 |
| silicon (Si) | 0.01-0.20 |
| chromium (Cr) | 0.02-0.3 |
| titanium (Ti) | 0.03-0.04 |
| nitrogen (N) | <0.007 |
| boron (B) | 0.002-0.006 |
| phosphorus (P) | <0.01 |
| sulfur (S) | <0.01 |
| molybdenum (Mo) | <1 | residual iron and smelting-related impurities.

A particularly suitable steel is one with the following alloy composition:

| C [%] | Si [%] | Mn [%]a | P [%] | S [%] | Al [%] | Cr [%] | Ti [%] | B [%] | N [%] |
|---|---|---|---|---|---|---|---|---|---|
| 0.20 | 0.18 | 2.01 | 0.0062 | 0.001 | 0.054 | 0.03 | 0.032 | 0.0030 | 0.0041 | residual iron and smelting-related impurities.

Such steels are expressly also suitable for use in the disclosure.

Figure 1:
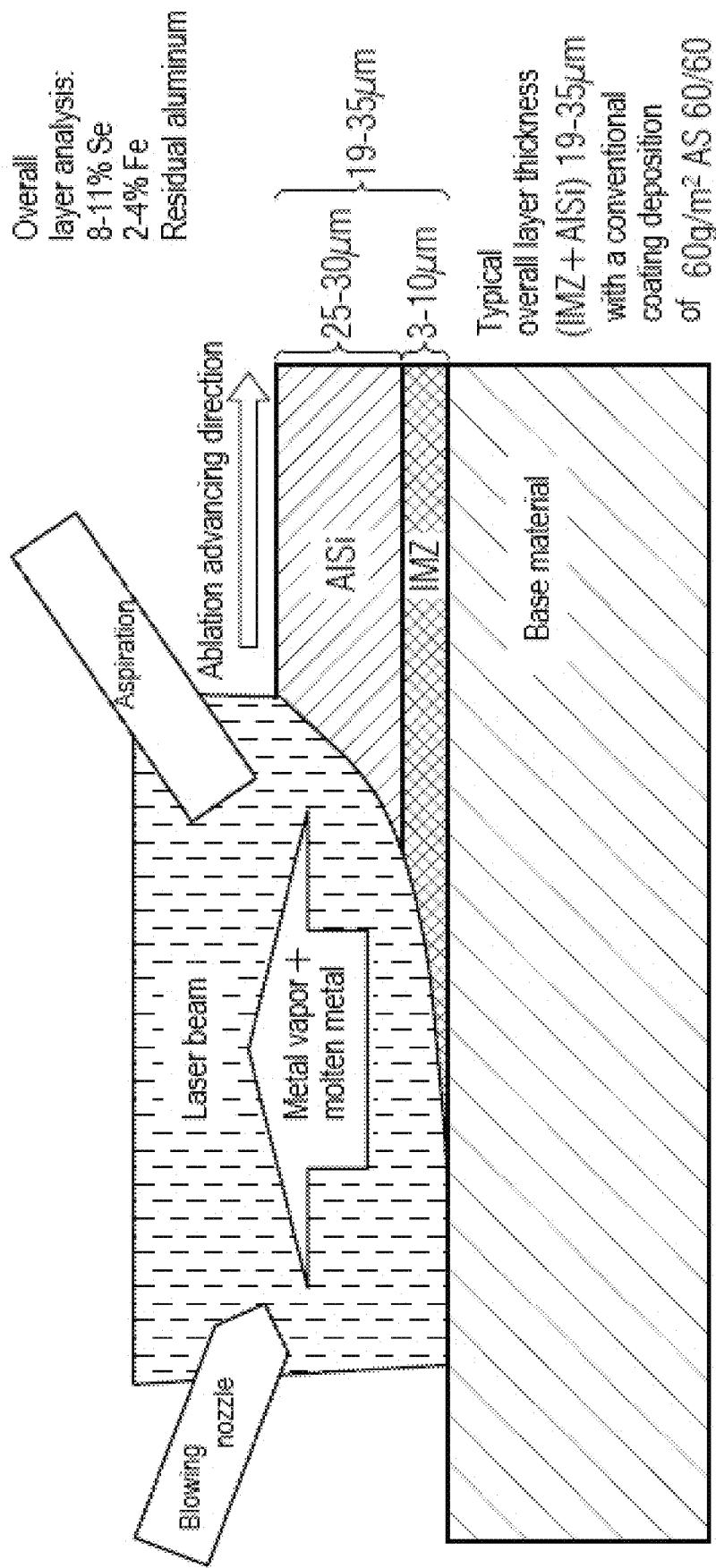
FIG. 1: shows a complete ablation according to the prior art.

FIG. 1 shows a complete ablation according to the prior art. It depicts a base material to which an aluminum silicon layer has been applied; between the aluminum silicon layer and the base material, an intermetallic zone or intermetallic interlayer has formed, which inevitably occurs due to reactions of the base material with the aluminum silicon coating at the elevated temperatures that occur during the hot-dip coating process. The thickness of the intermetallic interlayer in this case is approximately 3 to 10 μm and that of the aluminum silicon layer is 25 to 30 μm. Typical total layer thicknesses are thus 19 to 35 μm in a conventional coating run of 60 g aluminum silicon per m2. The overall layer analysis of this layer consists of aluminum with 8 to 11% silicon and 2 to 4% iron. In the complete ablation, both blowing nozzles and extractors in the vicinity of the incident laser beam are used to aspirate the metal vapor and molten droplets being generated.

Figure 2:
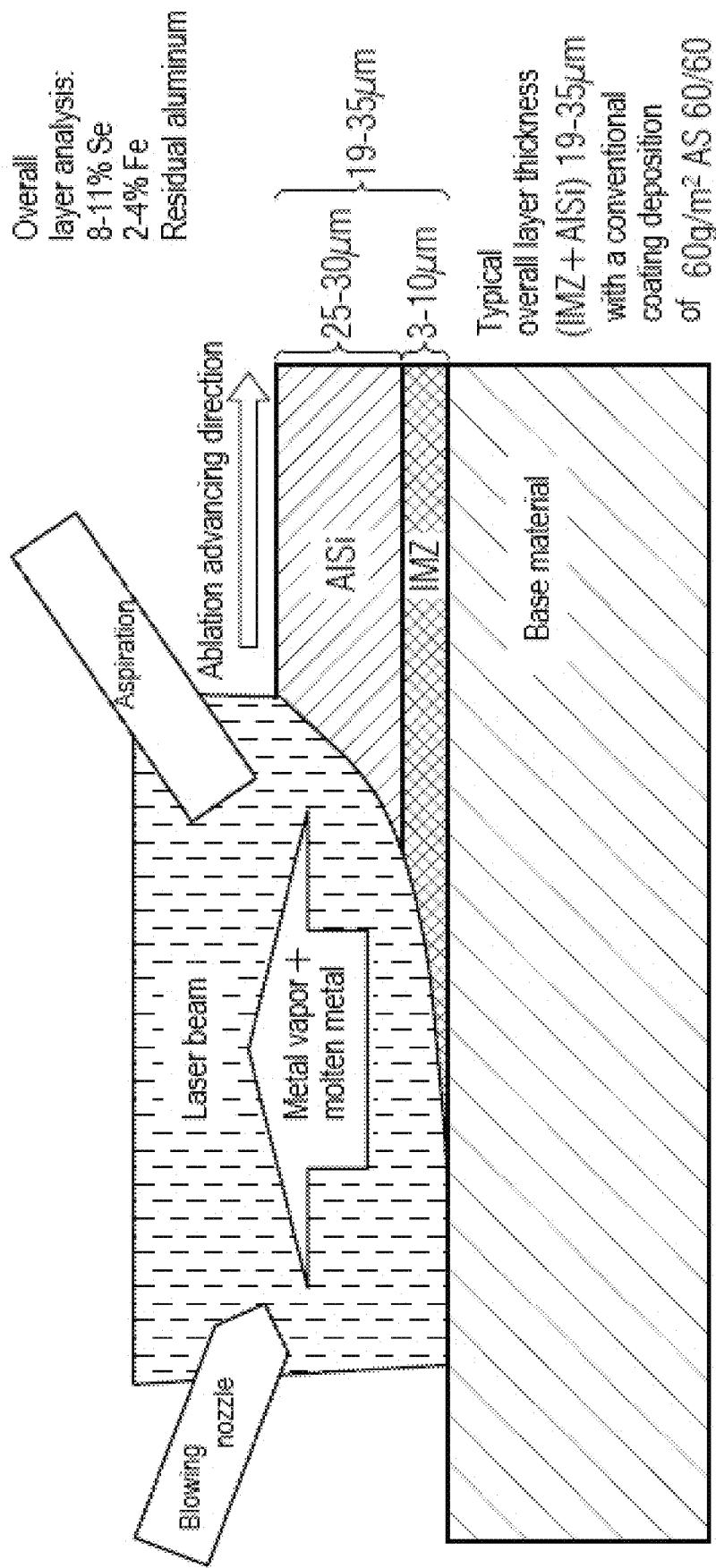
FIG. 2: shows a partial ablation according to the prior art.

FIG. 2 shows a so-called partial ablation process. Here, the aluminum silicon layer on the base material and the intermetallic interlayer between them are once again visible; in this case, though, the laser beam is guided so that the intermetallic interlayer is left behind and only the aluminum silicon layer is vaporized by the laser beam and correspondingly aspirated.

Figure 3:
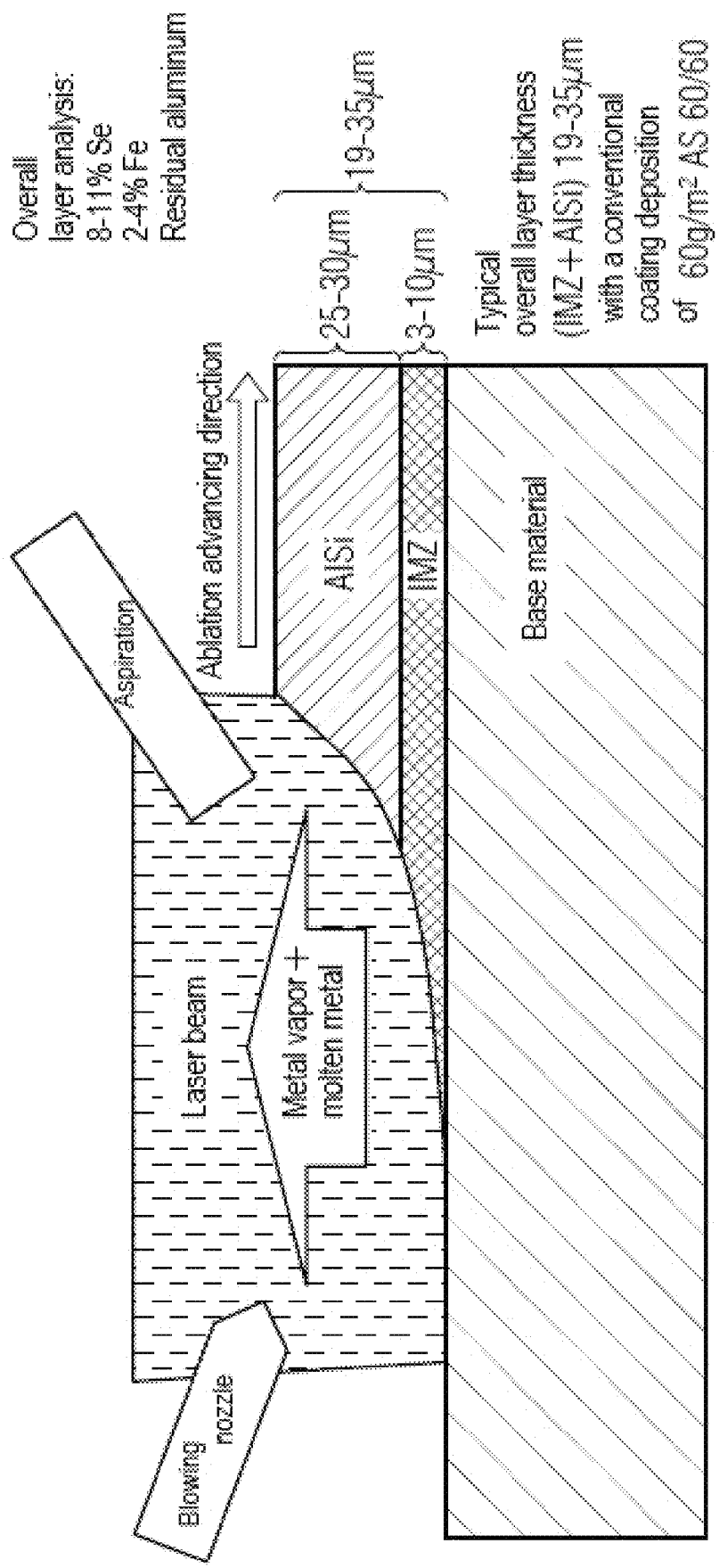
FIG. 3: shows the alloying ablation according to the disclosure.

FIG. 3 shows the reaction or alloying ablation according to the disclosure. Here once again, the aluminum silicon layer on the base material is present with the intermetallic interlayer between the two. Here, too, blowing nozzles and an extractor are used, but the laser beam influences both the aluminum silicon layer and the intermetallic zone as well as the base material and after the laser beam has removed the aluminum silicon layer and the intermetallic interlayer in their initial form, a metallic reaction layer has formed, which can extend into the base material, and in which an aluminum silicon layer or an intermetallic interlayer can no longer be detected. Thus according to the disclosure, the laser beam has produced an entirely separate metallic reaction layer, which has taken place based on metallic reactions in the reaction zone under the influence of the laser beam. In this case, the reaction layer itself can extend 5 to 50 μm into the base material from the surface of the original base material and can have an overall layer thickness of 5 μm to 100 μm and preferably 20 μm to 50 μm.

FIG. 20 shows the parameters for the partial ablation, the complete ablation, and the reaction ablation or alloying ablation. The partial ablation was performed with a speed of 8.5 m/min and a pulse duration of 56 nanoseconds. The average ablation power is 923 Watt, the ablation frequency is 10 kHz, and the blowing nozzle pressure is 0.5 bar of positive pressure. The complete ablation was performed with the same ablation speed of 8.5 m/min, but with a pulse duration of 64 nanoseconds at a frequency of 12 kHz and an average ablation power of 1191 Watt. The blowing nozzle pressure in this case is identical to that of the partial ablation.

The alloying ablation is performed with the same ablation speed, but by contrast with the partial ablation and complete ablation, the pulse duration is increased to 91 nanoseconds and an ablation power of 1702 Watt is used at a frequency of 18 kHz. Here, too, the blowing nozzle pressure is 0.5 bar of positive pressure.

Figure 4:
FIG. 4: shows an electron microscope image of an aluminum silicon coating on a steel sheet before a heat treatment.

FIG. 4 shows a typical aluminum silicon coating of the kind used on steel sheets in large industrial-scale applications. The aluminum silicon coating shown therein is depicted in the initial state, i.e. in the as-delivered state of a coated sheet of this kind, before this sheet has been heat treated. It should be noted here that the heat treatment of these conventional sheets, which are used for structural components in automobile manufacture, consists of austenitizing and quench hardening these sheets, which means that in the heat treatment, a sheet temperature of 900° is usually exceeded, but at least a temperature above the Ac3 point of the respective steel alloy. Here, a total layer thickness of 31 μm is shown, with a layer thickness of the intermetallic interlayer of 6 μm. The intermetallic interlayer consists of a composition that obeys the general formula $Fe_xAl_ySi_z$ and $Fe_xAl_y$. In the intermetallic zone, the EDX analysis reveals an aluminum content of 55.8%, an iron content of 33.5%, and a silicon content of 10.3%. The base material is usually a so-called boron manganese steel, which is highly hardenable. In particular, the base material is a so-called 22MnB5, which is one of the customary steels used for producing such components. The group of boron manganese steels that are suitable for this, however, is significantly larger and is expressly not limited to 22MnB5.

Figure 5:
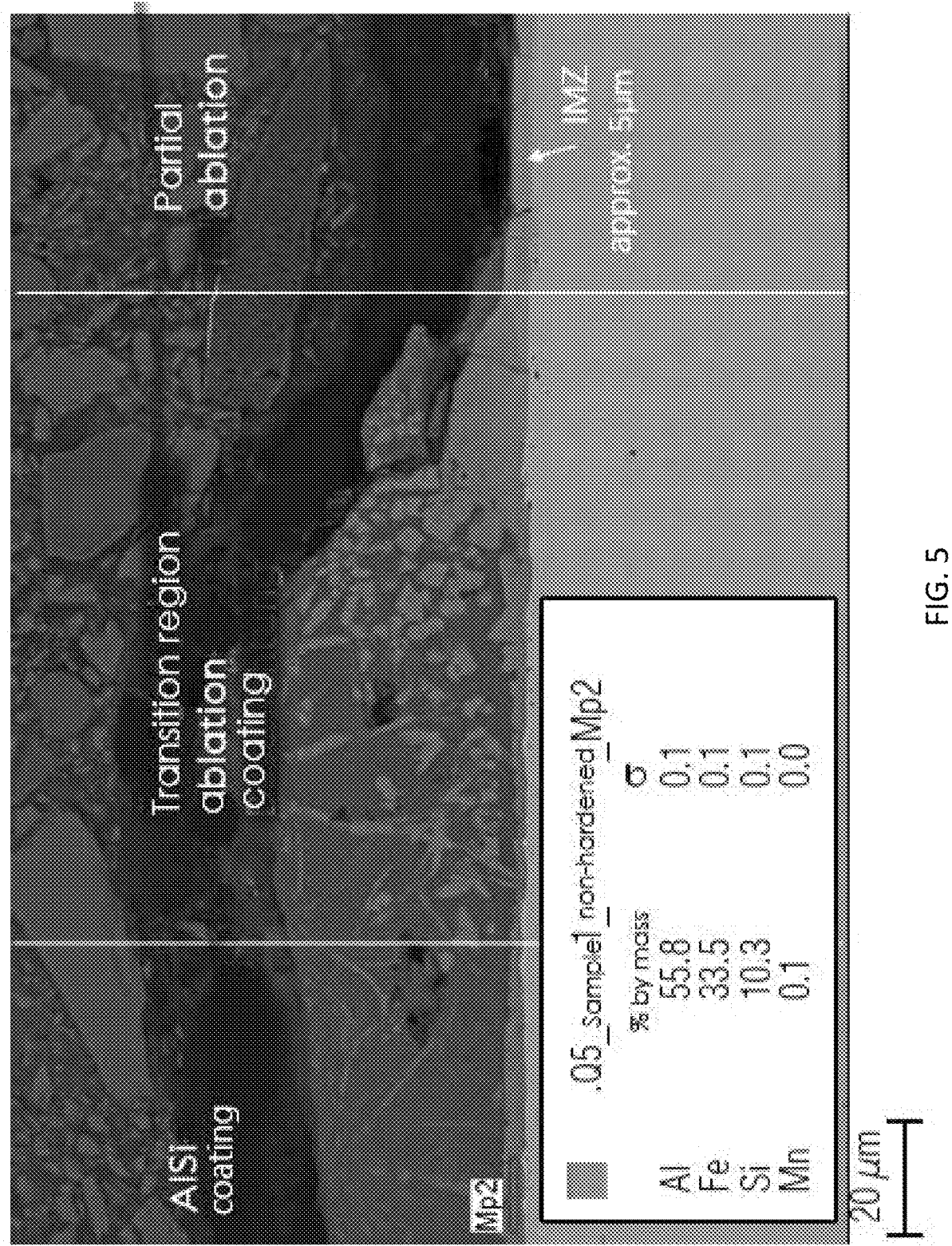
FIG. 5: shows an electron microscope image of a steel sheet with an aluminum silicon coating and a partial ablation track in the non-hardened state.

FIG. 5 shows a coating like the one in FIG. 4, but which has a partial ablation track according to the prior art, in the non-hardened state. In the left region of FIG. 5 is an uninfluenced aluminum silicon coating with the intermetallic zone, as shown in FIG. 4. In the right region, a partial ablation track is shown in which the intermetallic interlayer is only still present with a layer thickness of approx. 5 μm. Interposed between the partially ablated region and the coating region, a transition region is visible in which the coating is altered due to the influence of the heat of the laser beam.

Figure 6:
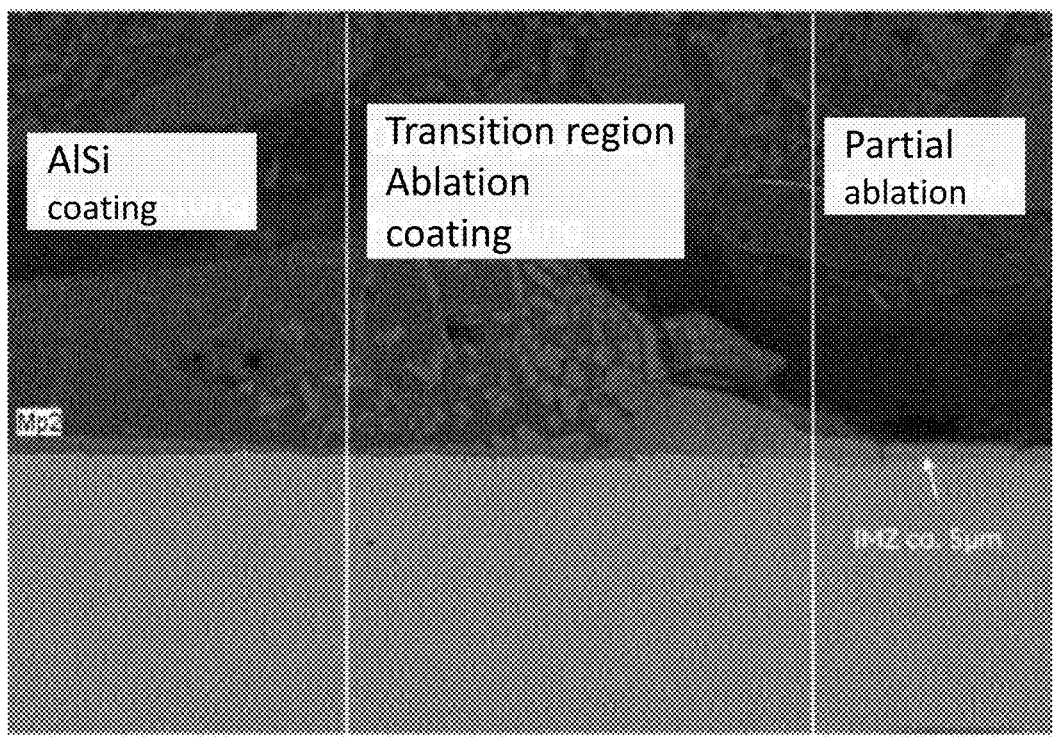
FIG. 6: shows an electron microscope image and light microscope image of the partial ablation track according to FIG. 5.
Figure 6:
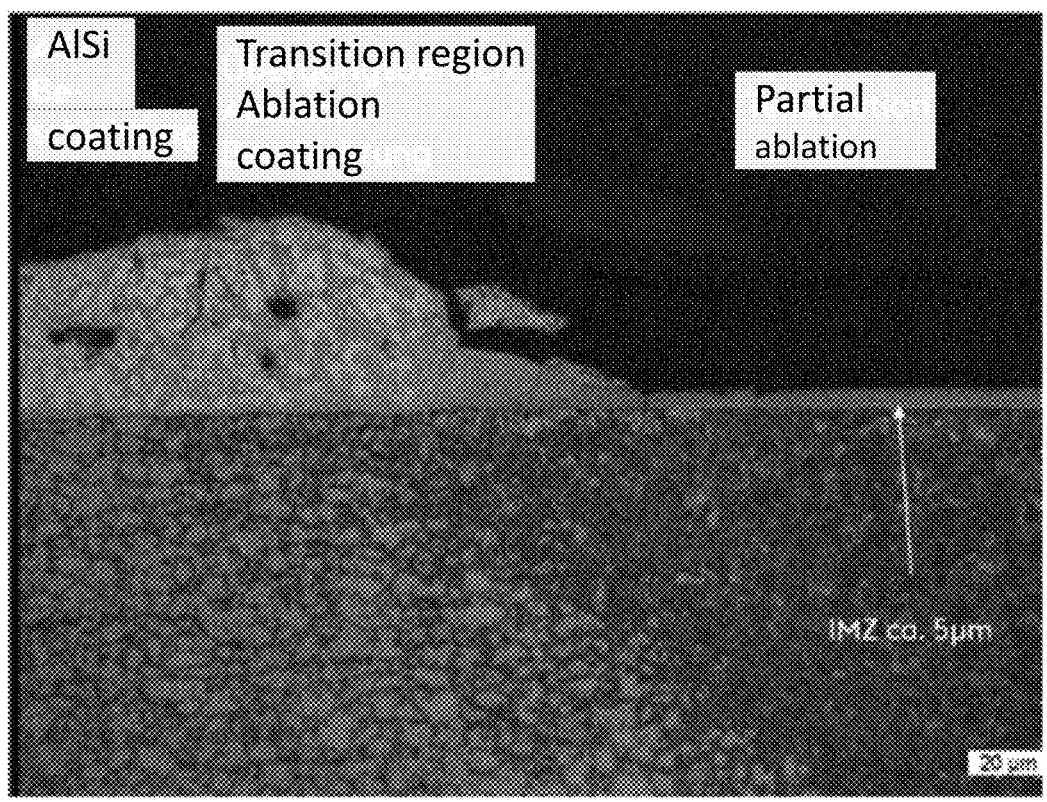

For comparison purposes, FIG. 6 shows the same state again, compared to a light microscope image of the same region that clearly shows the partially ablated region, the transition region between ablation and coating, and the aluminum silicon coating region.

Figure 7:
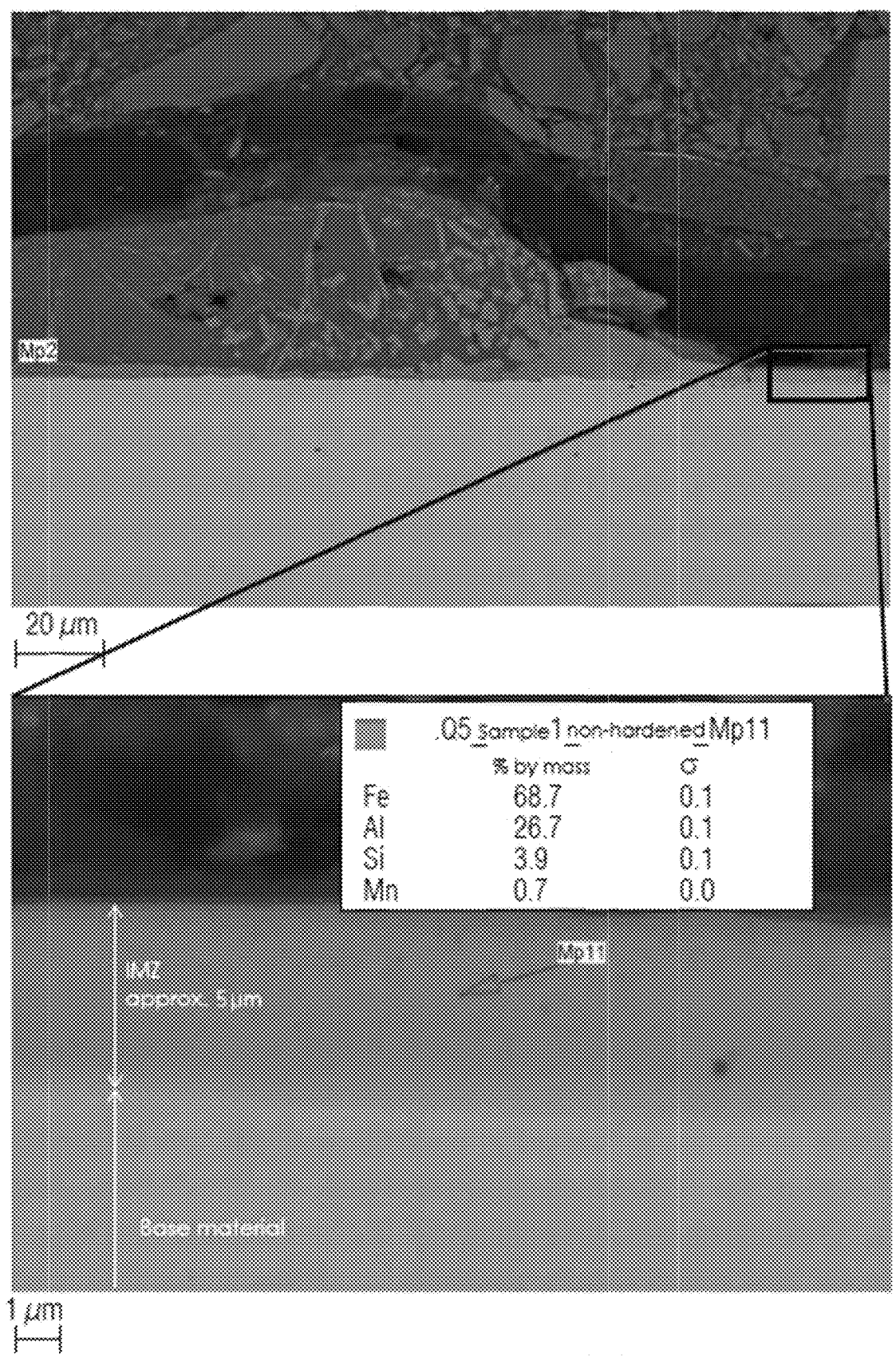
FIG. 7: shows a detail from the non-hardened partial ablation layer according to FIG. 6.

FIG. 7 once again shows the partial ablation region with an enlarged detail of the remaining intermetallic interlayer approx. 5 μm thick and the underlying base material. The partial ablation has also altered the intermetallic interlayer somewhat because now, the iron content is 68.7%, the aluminum content is 26.7%, the silicon content is 3.9%, and the manganese content is 0.7%. It is thus clear that a further reaction under the influence of the laser beam heat has taken place so that the aluminum content is reduced in favor of the iron content and silicon content. In addition, the increased manganese content indicates that a reaction with the boron manganese steel has taken place.

Figure 8:
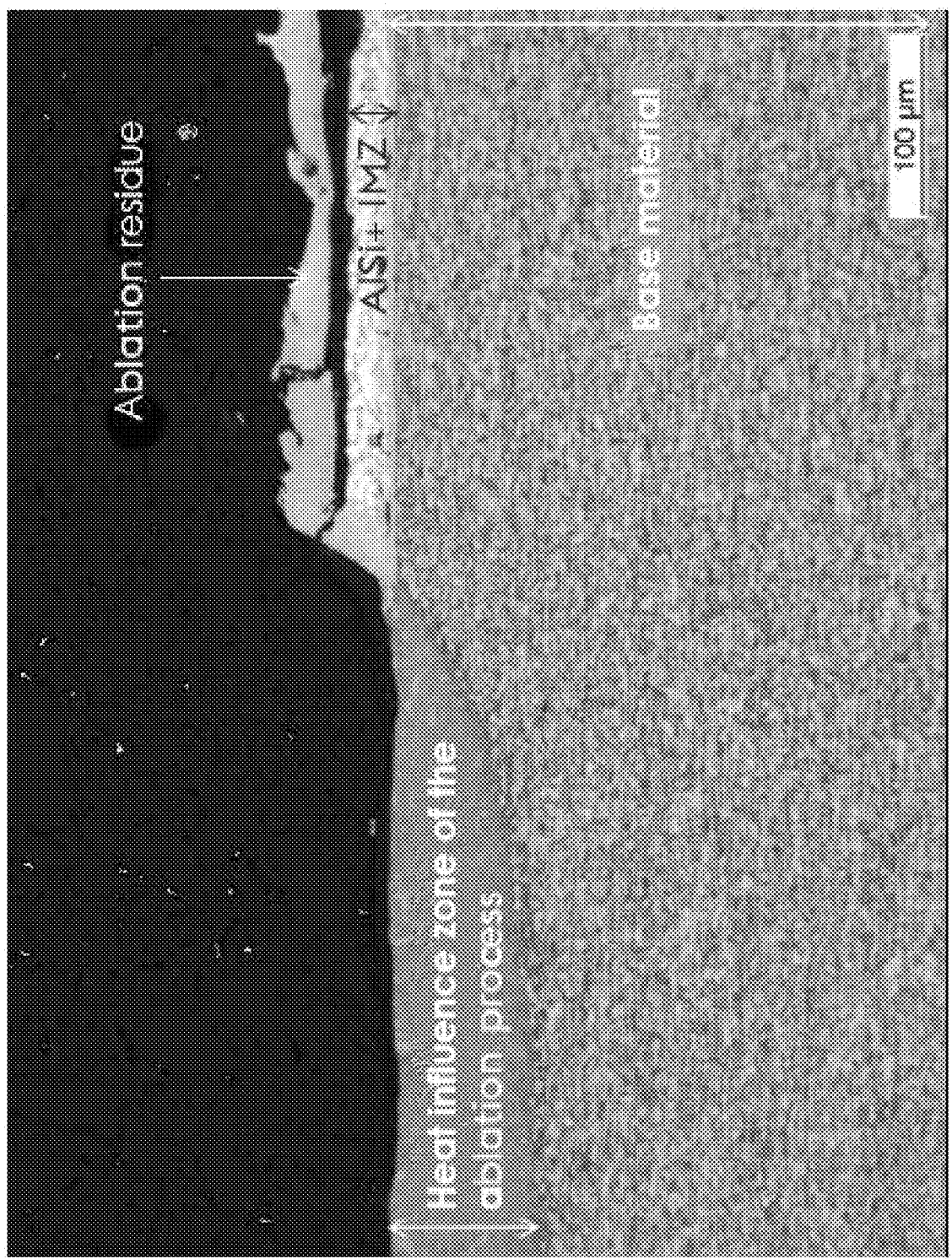
FIG. 8: shows a light microscope image of a complete ablation track.
Figure 9:
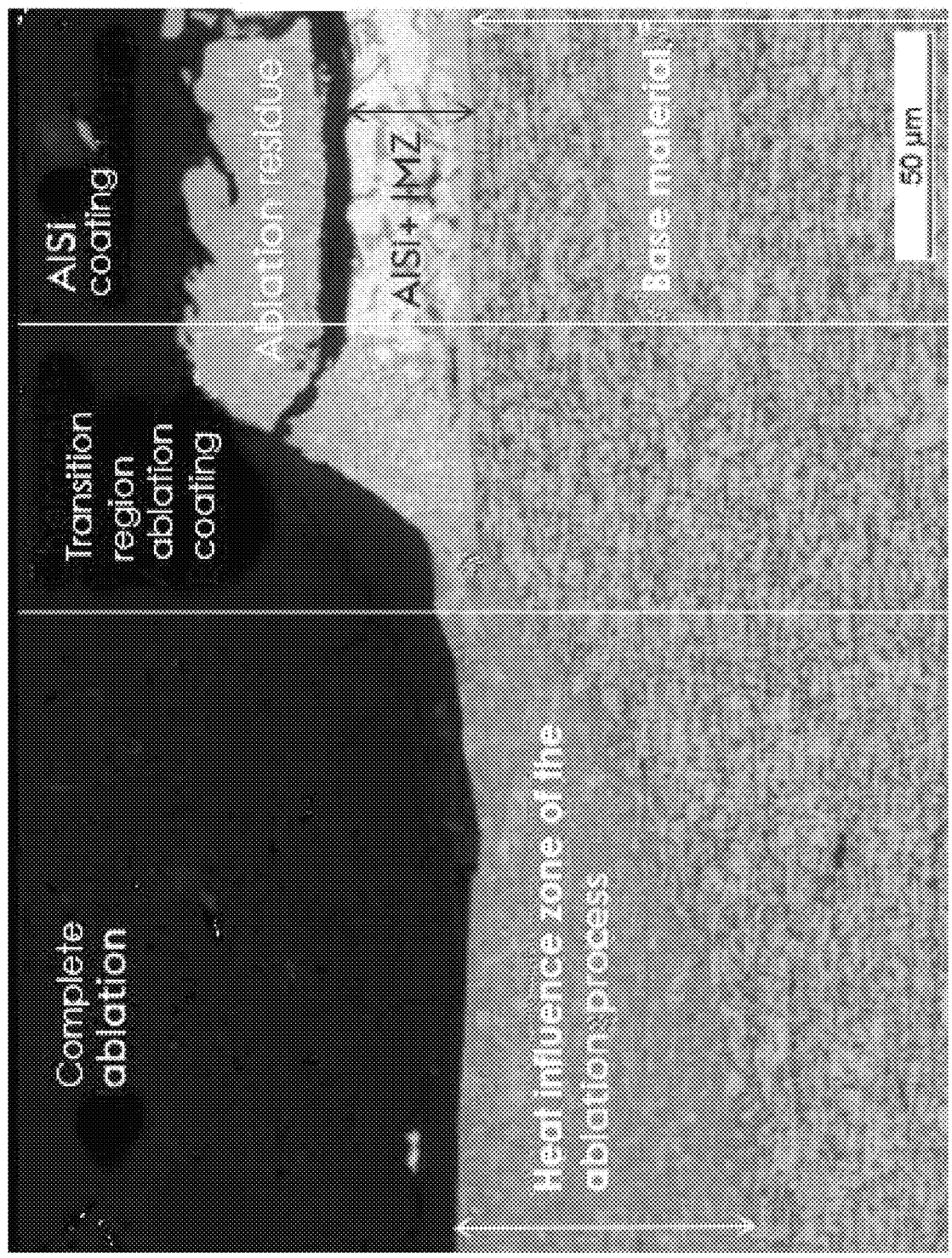
FIG. 9: shows an enlarged image of the complete ablation track according to FIG. 8.

FIG. 8 shows a micrograph of a non-hardened, completely ablated region; in the region of the complete ablation, a heat influence zone of the ablation process is visible, while spaced apart from this, the aluminum silicon layer and the intermetallic interlayer are visible. Ablation residue is present on top of this and under it is the base material. The enlargement of this region in FIG. 9 shows the transition region in which the aluminum silicon layer is once again altered due to the influence of the heat of the laser.

Figure 10:
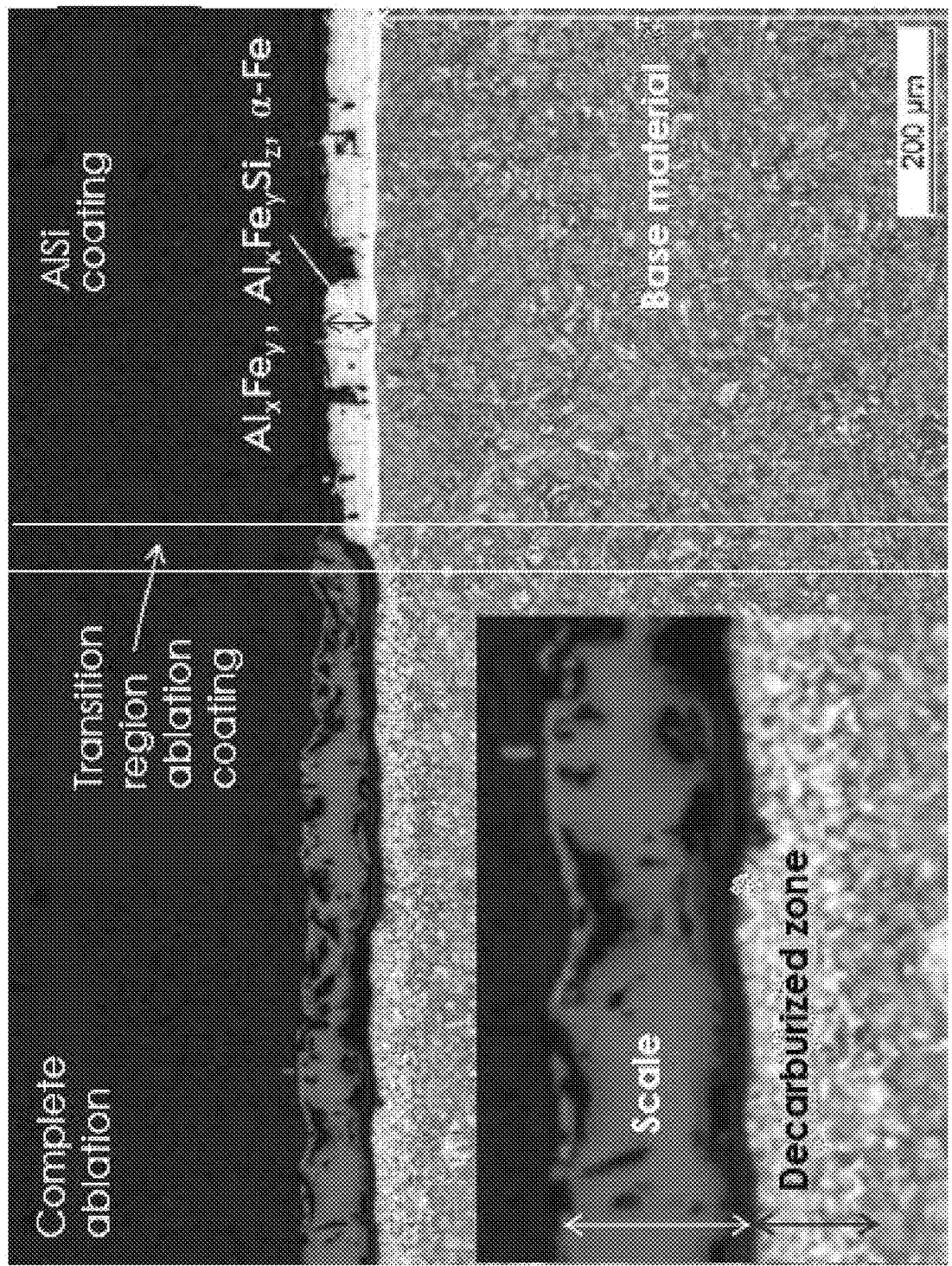
FIG. 10: shows complete ablation track according to FIG. 9 in the hardened state.

FIG. 10 then shows the hardened state, i.e. a state that has been produced by subjecting the sheet, which has previously undergone complete ablation, to an austenitization and quench hardening. The hardening has also altered the aluminum silicon coating on the intermetallic interlayer; in particular, the latter now consists of the general composition $Al_xFe_y$, $Al_xFe_ySi_z$, and α-Fe. In the region of the complete ablation, a scale layer is visible on a decarburized zone, i.e. in this case, the hardening and in particular the heat treatment for the hardening, namely the austenitization, has resulted in the fact that the base material is oxidized on the surface (scale), i.e. essentially consists of iron oxides and oxides of the alloying elements, whereas in the upper region, the carbon that is intrinsically required for the hardening has been reduced in the steel by the heat treatment and removed through oxidation.

Figure 11:
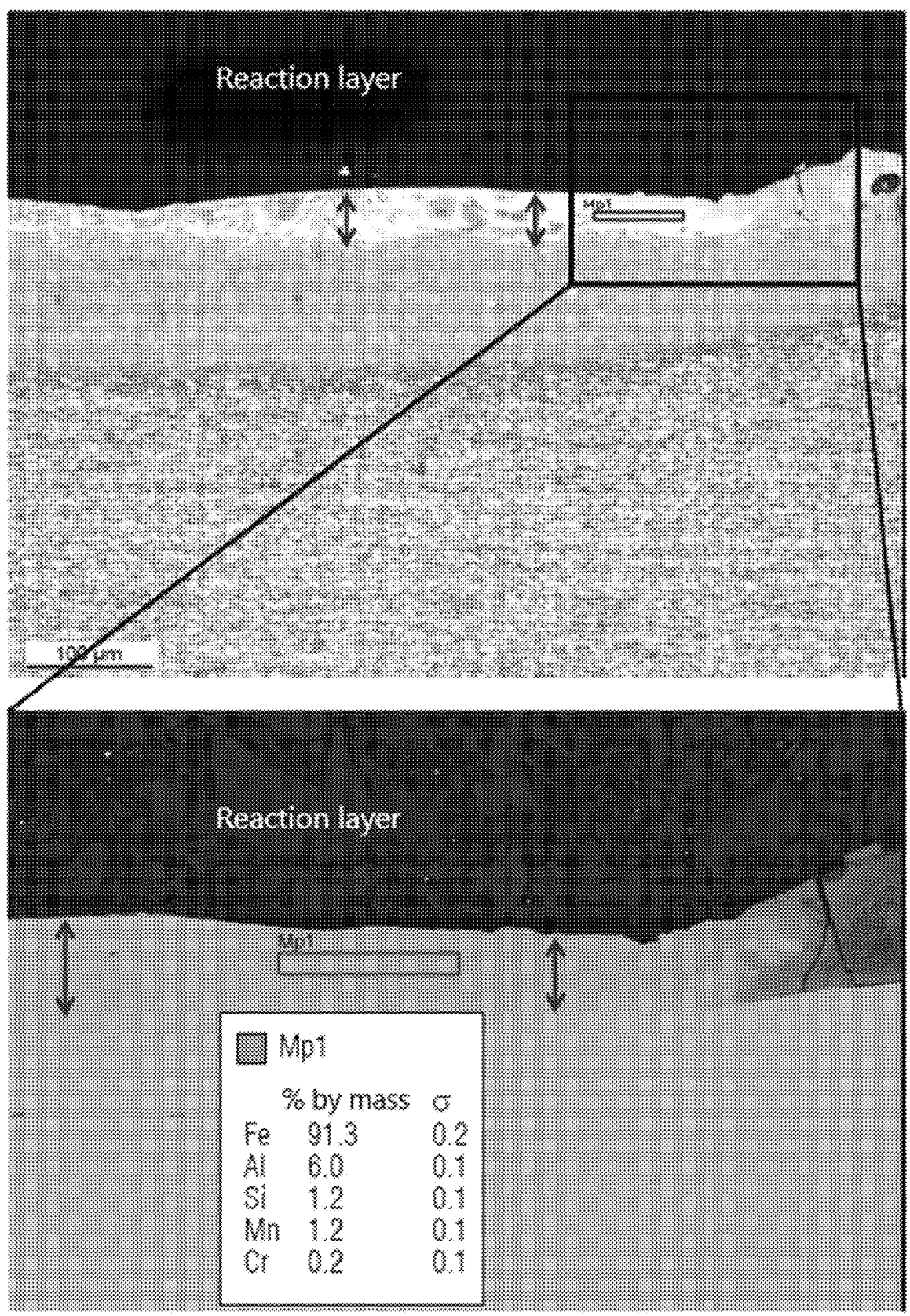
FIG. 11: shows the alloying ablation according to the disclosure in the non-hardened state in a comparison between an electron microscope image and a light electron microscope.
Figure 12:
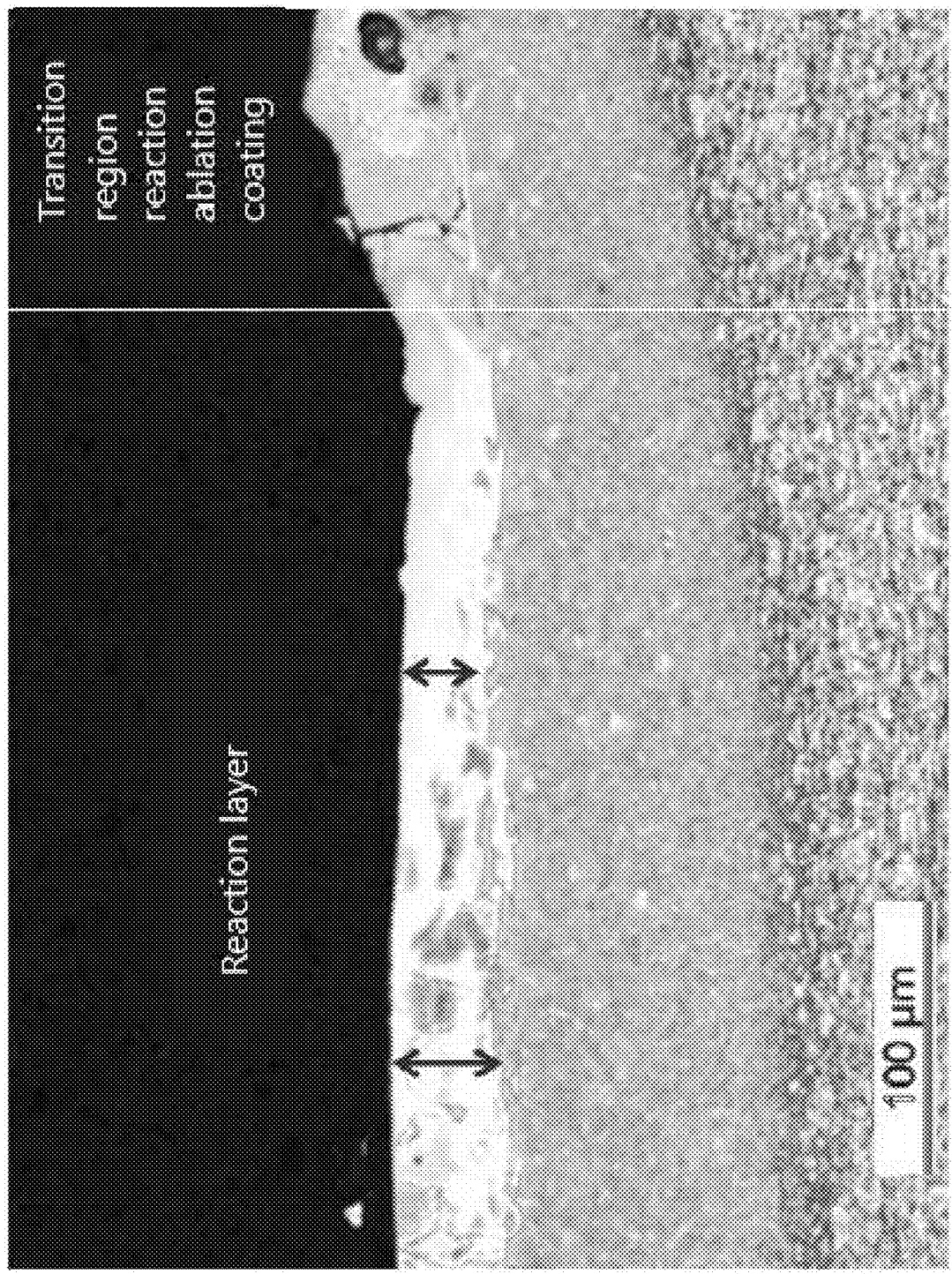
FIG. 12: shows the alloying ablation track in the non-hardened state in an enlarged light microscope depiction.

In the alloying or reaction ablation according to the disclosure (FIG. 11), in the non-hardened state, it is clear that instead of an intermetallic interlayer and/or a pure base material layer, a white reaction layer has been left behind, which is visible on the right side in FIG. 12. An element analysis in this white metallic reaction layer shows that in it, the iron content is 91.3%, the aluminum content is 6%, the silicon content is 1.2%, the manganese content is 1.2%, and the chromium content is 0.2%. The comparatively high manganese and chromium contents show how powerful a reaction with the base material has taken place. The remaining contents of 6% aluminum and 1.2% silicon have turned out to be absolutely non-critical with regard to the load-bearing capacity of a welding seam produced with such a sheet.

In FIG. 12 once again shows a light microscope image of the corresponding region.

Figure 13:
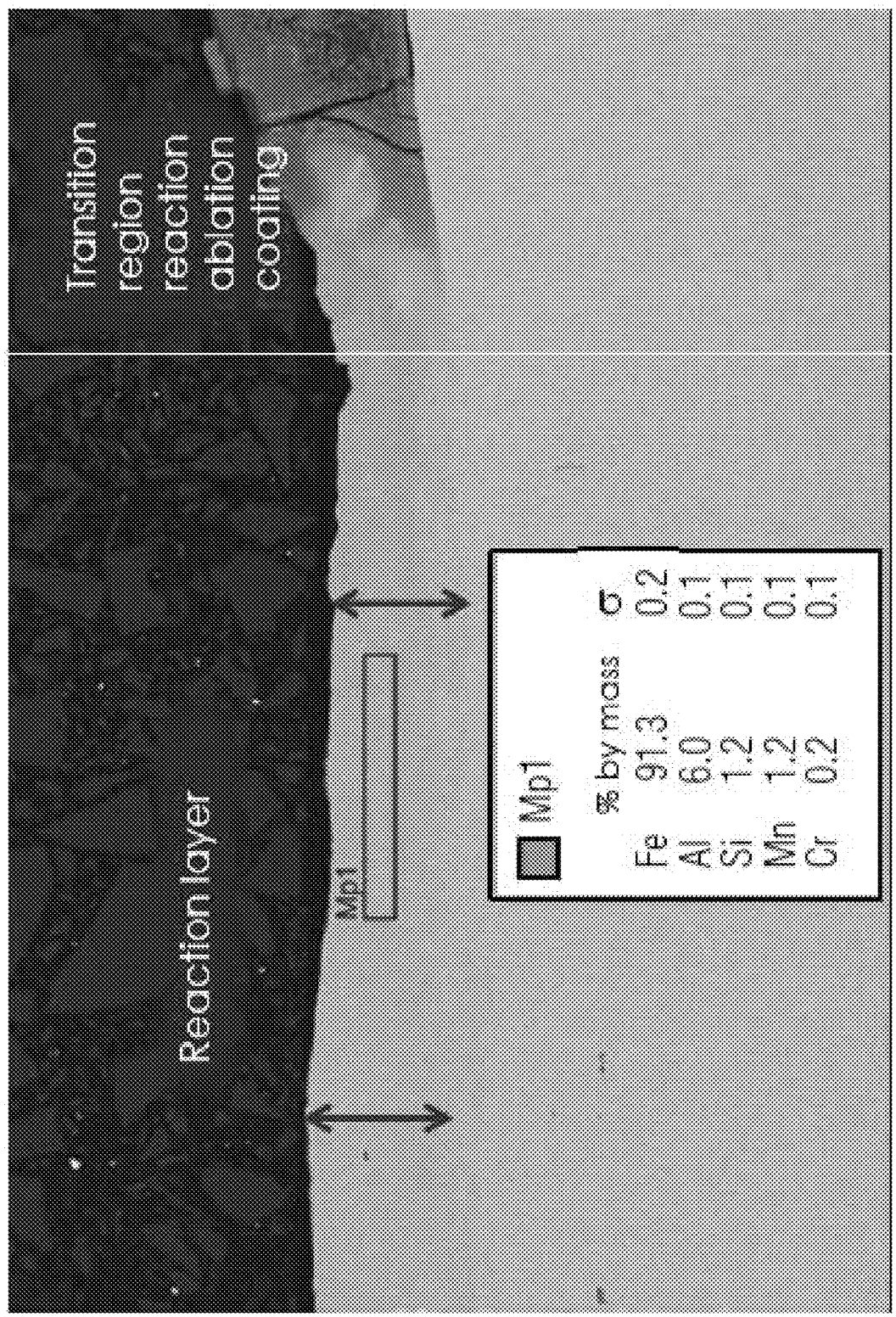
FIG. 13: shows an enlarged electron microscope image in the non-hardened state.

FIG. 13 once again shows an enlarged region of the reaction layer and the transition region to the aluminum silicon coating.

Figure 14:
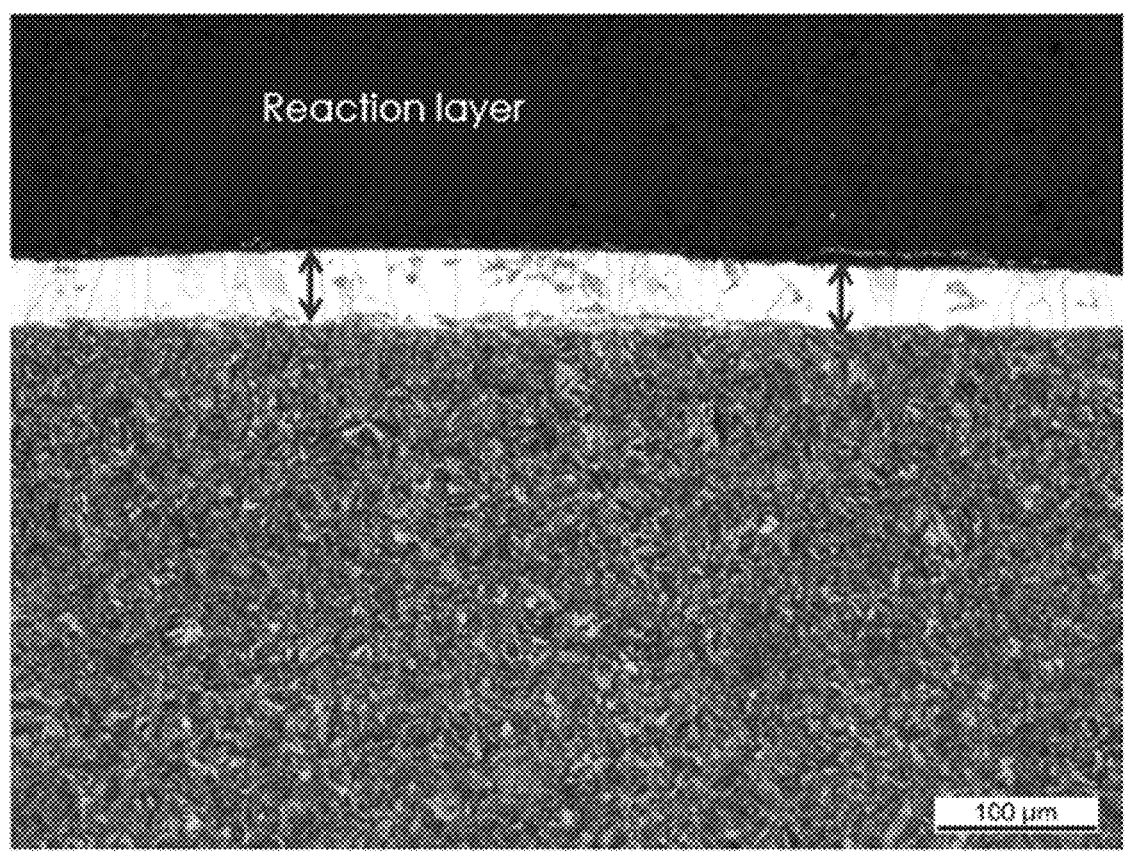
FIG. 14: shows the alloying ablation track in the hardened state in a light microscope image and an electron microscope image with element identification.
Figure 14:
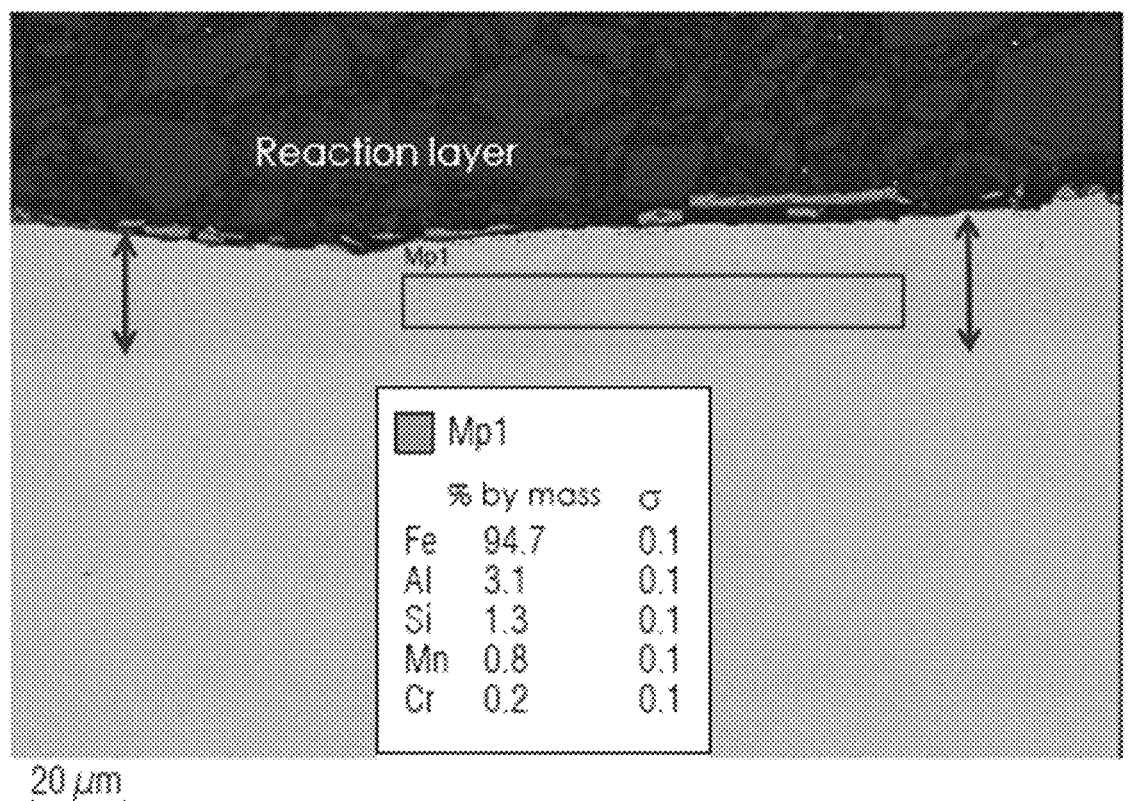

In the hardened state, the extreme superiority of the reaction layer according to the disclosure compared to all known prior welding preparations for such sheets is identifiable (FIG. 14). In the hardened state, the reaction layer is present in a very clearly defined way, while the base material is not influenced at all and in particular, exhibits no decarburization or scale underlying it. After the hardening, it is clear that in the reaction layer (FIG. 15, bottom), the iron content has further increased at the expense of the aluminum and silicon contents and once again, the manganese content and chromium content have also increased slightly. Nevertheless, this reaction layer has provided a powerful anti-corrosion effect.

Figure 15:
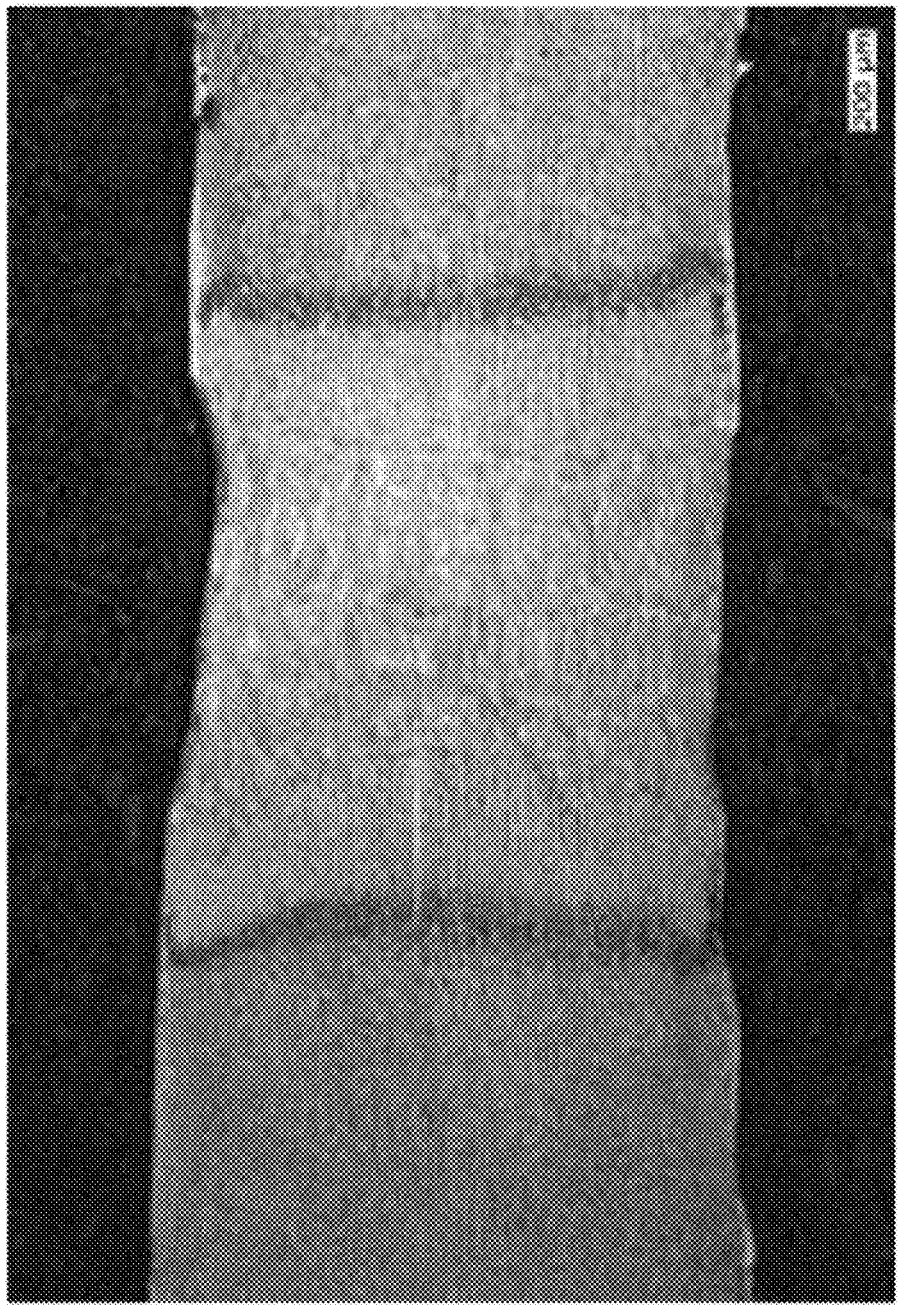
FIG. 15: shows a component that has undergone welding preparation according to the disclosure, in the welded and non-hardened state.
Figure 16:
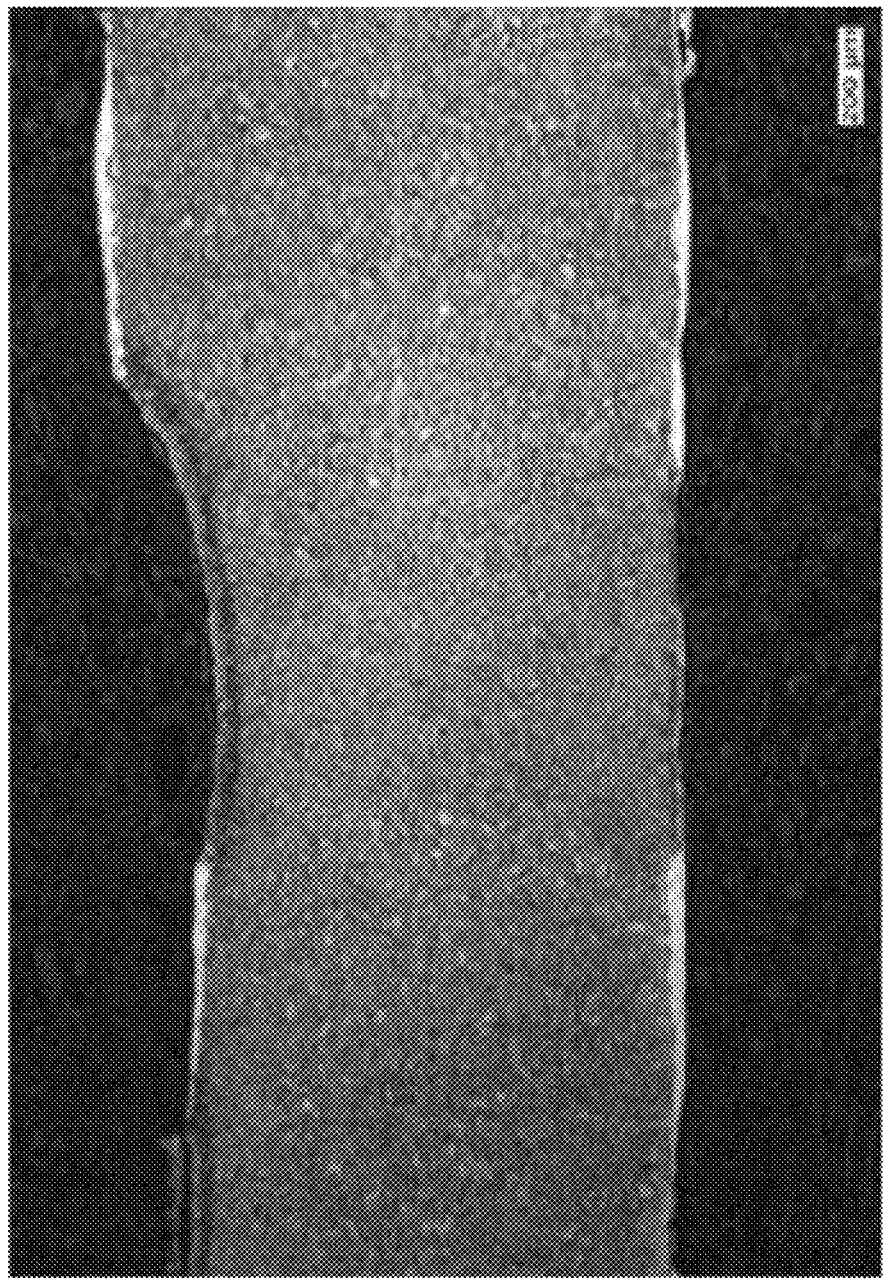
FIG. 16: shows the component according to FIG. 16 after the hardening.

If a component that is prepared in this way according to the disclosure is welded to another component of this kind, this yields the non-hardened state shown in FIG. 15. FIG. 16 shows the hardened state. Here once again, it is very clear how reliably the reaction ablation zone or alloying ablation zone, which appears white therein, has protected the underlying material. FIG. 17 shows the parameters; in this case, an ablation speed of 8.5 m/min and an average ablation power of 1702 Watt were used at a frequency of 18 kHz and with a blowing nozzle pressure of 1.5 bar of positive pressure. Welding was likewise performed at a speed of 8.5 m/min with a welding power of 4920 Watt and a gas flushing of 15 l argon per minute.

Figure 18:
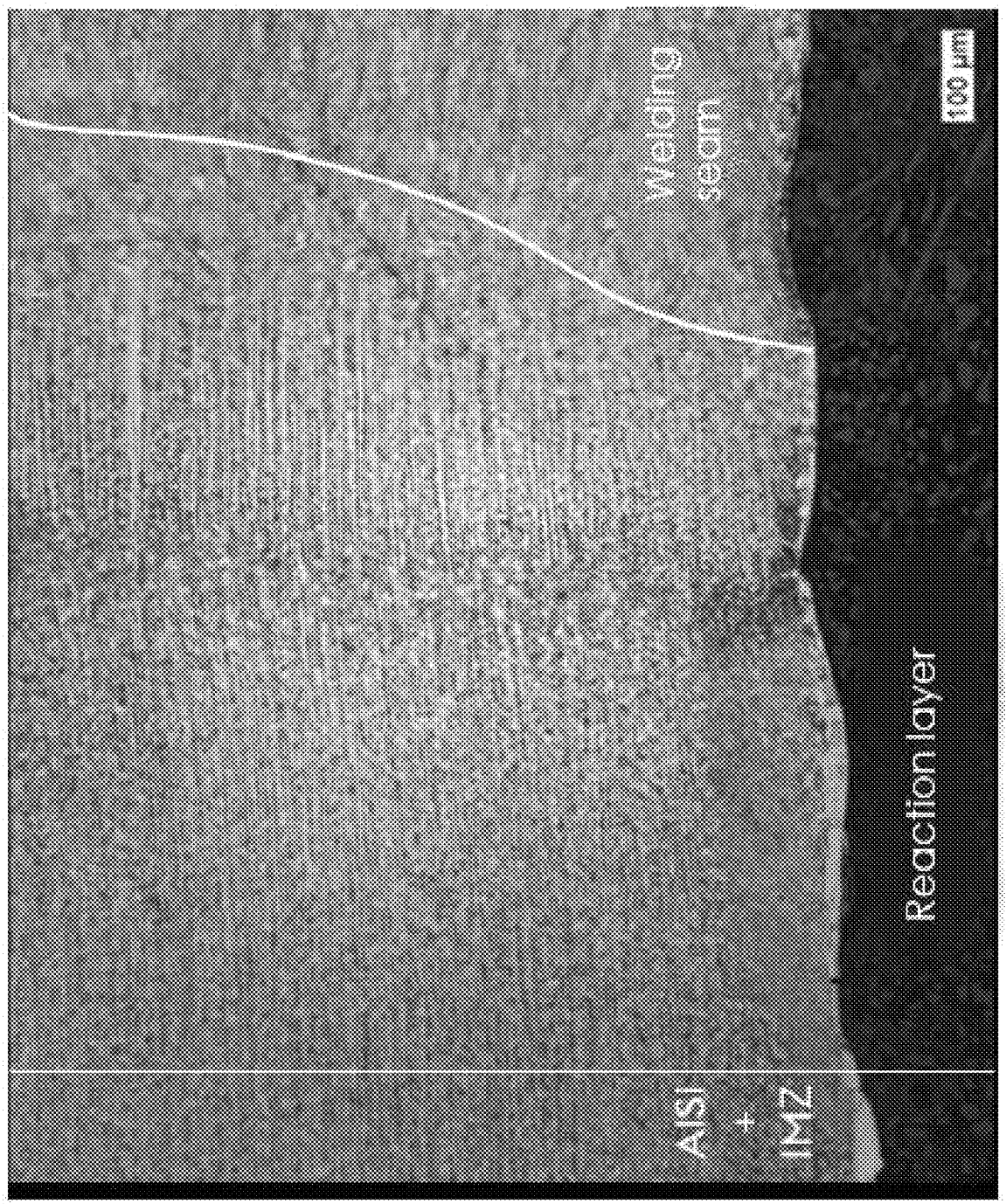
FIG. 18: shows a detail in the region of the welding seam edge of the component that has undergone welding pretreatment according to the disclosure in the non-hardened state.
Figure 19:
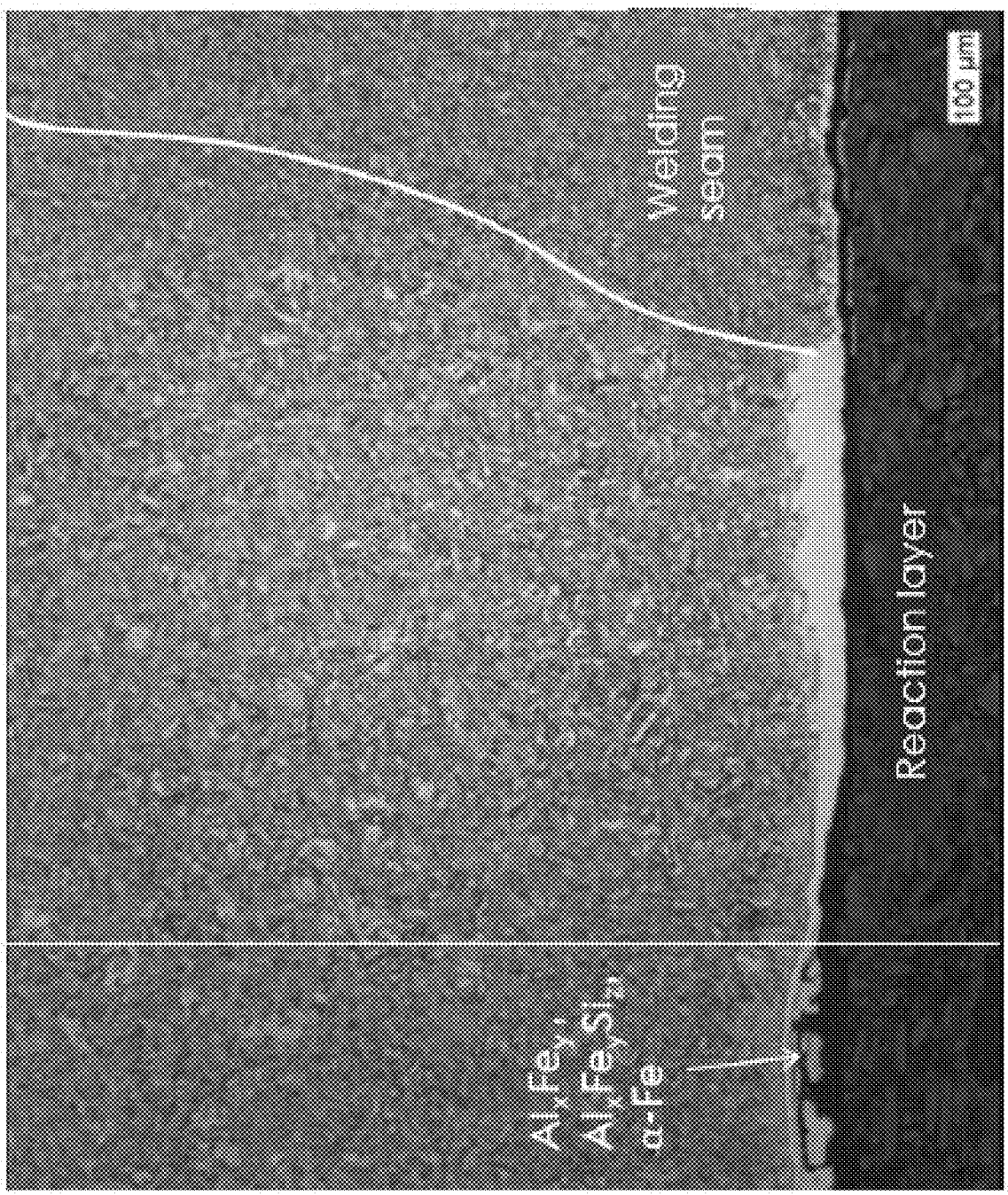
FIG. 19: shows the component according to FIG. 19 in the hardened state.

FIG. 18 shows the transition to the welding seam in the non-hardened region, showing the aluminum silicon layer plus the intermetallic interlayer at the far left, the reaction layer in the middle region, and the welding seam at the far right. In the hardened state (FIG. 19), an aluminum silicon layer, which has been converted by the heat treatment, is visible on the intermetallic interlayer at the far right, the clearly defined reaction layer that is formed is visible in the middle region, and next to it, the welding seam.

The hardening took place at a furnace temperature of 930° C. and with a furnace dwell time of 5 minutes and 10 seconds. The transfer time to the cooling was 8 seconds, with the cooling taking place in a water-cooled sheet die.

The ablation laser used was the type i1600E-60 laser produced by the company Powerlase. The ablation laser optics has a focus geometry of 2.4×0.4 mm2, with the 0.4 mm being oriented in the ablation advancing direction. The focal length of the focus lens was approximately 150 mm; the laser optics can be ordered from the company Andritz Soutec with the order number 62-515781. The suitable extraction hood that was used in the tests is also produced by the company Andritz Soutec and can be ordered from Andritz Soutec under the name "Souspeed" ablation extraction hood with the order number 64-515460. The result according to the disclosure can be reliably reproduced with the given parameters and the above-mentioned equipment.

With the disclosure, it is therefore advantageous that the inventors have discovered a way on the one hand to inhibit scale formation and edge decarburization and on the other hand to preclude the formation of intermetallic or soft ferritic phases without rendering the method excessively complex. In addition, the load-bearing cross-sections are not reduced.

What is claimed is:

1. A method for welding preparation of steel sheets comprising:

providing at least one steel sheet composed of a hardenable steel material with an aluminum silicon anti-corrosion coating, wherein an alloying ablation is performed;

passing a laser beam over aluminum silicon layer on the sheets, the underlying intermetallic interlayer and the underlying base material, in the region of a desired welding edge of the at least one sheet;

vaporizing and aspirating the material of the aluminum silicon layer and the underlying intermetallic interlayer;

producing a reaction with the base material extending into the base material;

producing a metallic reaction ablation layer or alloying ablation layer having iron and alloying elements from the base material and aluminum silicon from the aluminum silicon layer and the intermetallic interlayer; and wherein, the reaction layer reaching a thickness of 5 μm to 100 μm whereby the aluminum content of the metallic reaction layer after the welding preparation is >2% and does not exceed 11.3% (in % by mass).

2. The method according to claim 1, wherein the advancing speed $V_{abl}$ is between 4 m/min and 30 m/min, the laser is operated in a pulsing fashion, with pulse durations between 20 to 150 ns, and at frequencies of 1 to 100 kHz, at average ablation powers of 500 W to 5000 W.

3. The method according to claim 1, wherein the method is carried out so that the aluminum content of the metallic reaction layer after the welding preparation does not exceed 10% (in % by mass).

4. The method according to claim 1, wherein the method is carried out so that the aluminum content of the metallic reaction layer after the welding preparation is >1% (in % by mass).

5. The method according to claim 1, wherein the base material is a steel, which is a boron manganese steel that can be hardened by means of an austenitization and quench hardening process.

6. The method according to claim 1, wherein a steel of the general alloy composition (in % by mass) is:

| | |
|---|---|
| carbon (C) | 0.03-0.6 |
| manganese (Mn) | 0.8-3.0 |
| aluminum (Al) | 0.01-0.07 |
| silicon (Si) | 0.01-0.8 |
| chromium (Cr) | 0.02-0.6 |
| titanium (Ti) | 0.01-0.08 |
| nitrogen (N) | <0.02 |
| boron (B) | 0.002-0.02 |
| phosphorus (P) | <0.01 |
| sulfur (S) | <0.01 |
| molybdenum (Mo) | <1 | and residual iron and smelting-related impurities is used as the base material.

7. The method according to claim 1, wherein a steel of the general alloy composition (in % by mass) is:

| | |
|---|---|
| carbon (C) | 0.03-0.30 |
| manganese (Mn) | 1.00-3.00 |
| aluminum (Al) | 0.03-0.06 |
| silicon (Si) | 0.01-0.20 |
| chromium (Cr) | 0.02-0.3 |
| titanium (Ti) | 0.03-0.04 |
| nitrogen (N) | <0.007 |
| boron (B) | 0.002-0.006 |

-continued

| | |
|---|---|
| phosphorus (P) | <0.01 |
| sulfur (S) | <0.01 |
| molybdenum (Mo) | <1 | and residual iron and smelting-related impurities is used as the base material.

8. The method according to claim 1, wherein a steel of the alloy composition C=0.20, Si=0.18, Mn=2.01, P=0.0062, S=0.001, Al=0.054, Cr=0.03, Ti=0.032, B=0.0030, M=0.0041, residual iron, and smelting-related impurities is used as the base material, with all of the above indications expressed in % by mass.

9. The method according to claim 1, wherein the width of the reaction ablation layer or alloying ablation layer from the joint or butt joint is 0.4 to 2.4 mm.

10. The method according to claim 1, wherein the vapor and molten particles produced are conveyed away from the weld joint by means of suitable blowing nozzles in the pressure range from 0.1 to 20 bar and aspiration devices.

11. A sheet bar that is produced and prepared for welding with a method according to claim 1.

12. The method according to claim 5, wherein the base material a steel from the group of 22MnB5 steels is used.

13. A welded component made of sheet bars according to claim 11.

14. The method according to claim 10, wherein the vapor and molten particles produced are conveyed away from the weld joint by means of suitable blowing nozzles in the pressure range from 0.3 to 5 bar and aspiration devices.

15. A welded component made of sheet bars, the sheet bars each having been produced and prepared for welding with the method of claim 1, wherein the sheet bars are placed against one another with ablated joints and are welded by means of laser.

16. The welded component made of sheet according to claim 15, wherein during the welding, a filler rod is introduced into the welding seam.

17. The method according to claim 1, wherein the reaction layer has a thickness of 20 μm to 50 μm.

18. The method according to claim 2, wherein the advancing speed $V_{abl}$ is between 7 m/min and 15 m/min, the laser is operated in a pulsing fashion, with pulse durations between 30 to 100 ns, and at frequencies of 10 to 30 kHz, at average ablation powers of 1000 W to 2000 W.

19. The method according to claim 3, wherein the aluminum content of the metallic reaction layer after the welding preparation does not exceed 8% (in % by mass).

* * * * *